Oct. 22, 1968 D. MAILLART 3,407,351
CROSSED-FIELD IONIZATION PRESSURE GAUGE
Filed Oct. 6, 1964 2 Sheets-Sheet 1

INVENTOR
DANIEL A. MAILLART

Oct. 22, 1968　　　　D. MAILLART　　　　3,407,351
CROSSED-FIELD IONIZATION PRESSURE GAUGE
Filed Oct. 6, 1964　　　　　　　　　　　2 Sheets-Sheet 2

INVENTOR
DANIEL A. MAILLART
BY Paul M. Craig, Jr.
ATTORNEY

United States Patent Office 3,407,351
Patented Oct. 22, 1968

3,407,351
CROSSED-FIELD IONIZATION PRESSURE GAUGE
Daniel Maillart, New York, N.Y., assignor to CSF-Compagnie Generale de Telegraphie Sans Fil, Paris, France
Filed Oct. 6, 1964, Ser. No. 401,793
Claims priority, application France, Oct. 16, 1963, 950,773
7 Claims. (Cl. 324—33)

ABSTRACT OF THE DISCLOSURE

Crossed-field ionization gauge having a separate cathode and collector disposed near opposite extremities of a space delimited by an ion collector and an electrode parallel thereto, a magnetic field generated in the space perpendicular to an electric field established between the ion collector and the electrode parallel thereto, an electron beam propagating through the space along trochoidal trajectories with the ion collector being disposed with relationship to the cathode so as to effect a shielding thereof against the light emitted by the cathode and against X-rays generated by the electron collector.

---

Figure 1:
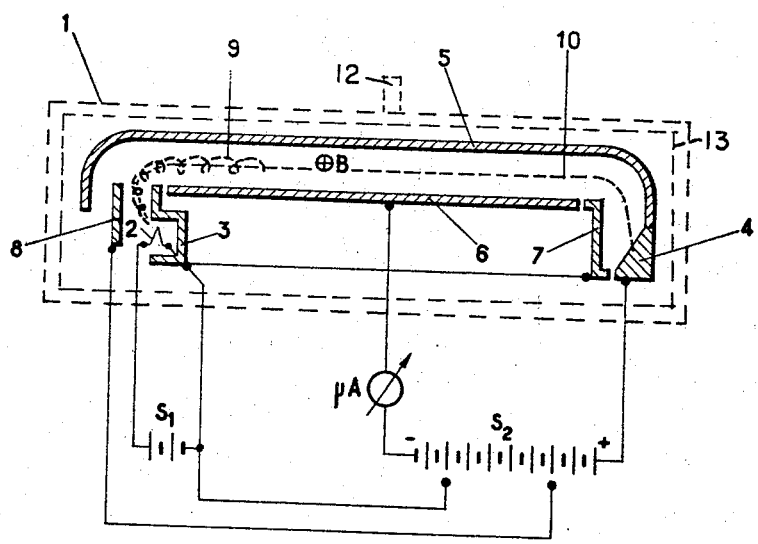

The present invention relates to gauges utilized in the vacuum technique for the measurement of pressures, and more particularly relates to the gauges of the "ionization" type, especially of the "hot cathode" type.

The classical ionization gauge, with hot cathode, is constituted, as is known, by a tube within which a thermionic cathode (tungsten filament) emits electrons toward a positive grid (electron collector) in the form of a cylinder, behind which is located a negative electrode, also cylindrical, the filament being placed in the axis of the tube.

When the gas, whose pressure one desires to measure, is admitted into the gauge, it ionizes therein by collisions with the electrons, and the thus formed positive ions are captured by the negative electrode (ion collector). The current in the ion collector then furnishes the measure of the pressure of the gas.

The use of this type of gauge is limited on the side of the low pressures in the neighborhood of $10^{-8}$ torr by reason of the residual current thereof, independent of the pressure and due to a permanent photo-electric emission produced in the ion collector, on the one hand, to a slight extent by the light of the cathode and, on the other, to a much more important extent, by soft X-rays, generated on the grid by the electrons which strike the same with an energy of about 150 electron-volts.

This residual current is considerably decreased (reduced to about 1%) in the gauge known under the name of "Bayard-Alpert Gauge" in which the ion collector, placed within the axis of the tube, is formed by a wire and presents from this fact a very reduced surface to the impact of X-rays and light.

If one desires to have a measuring sensitivity greater than that obtained in the Bayard-Alpert gauges, one currently employs a so-called "magnetron-type gauge." This gauge has a structure resembling that of magnetron tubes: the anode and the cathode are coaxial cylinders, and a permanent magnet furnishes a magnetic field parallel to the axis of the electrodes, in such a manner that the electrons describe therein long paths or trajectories within the annular space comprised between the cathode and the anode. The increase of the length of the trajectories of the electrons has as effect to increase the number of collisions with the gas particles in such a manner that, for a given pressure, the intensity of the ionization produced is increased in important proportions.

The magnetron gauge, however, presents inconveniences, of which the most important ones are the following:

The electronic current utilized must not exceed the value corresponding to the starting of oscillations which would disturb the operation of the apparatus and would render measurements impossible; it follows therefrom that the admissible electron currents are generally very slight and the same is true of the currents in the ion collector, whence the necessity to utilize direct-current amplifiers for the measurements;

The intensity of the magnetic field to be furnished is relatively high, whence the use of relatively heavy and encumbering magnets.

The present invention has as its object a novel ionization-type gauge structure, suppressing completely the possibility of a photo-electric emission in the ion collector and eliminating at the same time the aforementioned inconveniences of the magnetron gauges.

The gauge according to the present invention is of the type in which electrons, issued from a cathode, are subjected to the combined action of an electric field and of a magnetic field crossed with respect to the electric field, a collector, positive with respect to the cathode being provided to capture the electrons, and a negative collector for capturing the ions formed by the collisions between electrons and gas molecules whose pressure one desires to measure, the gauge being characterized in that (1) the cathode and the collector are disposed near opposite extremities of a space, either linear or curved, delimited by the ion collector and an electrode parallel to this collector, carried at the same potential or substantially the same potential as the electron collector, (2) the intensities of the two crossed fields are chosen in such a manner that, in operation, the electrons propagate within the said space along trochoidal trajectories prior to attaining the electron collector, and (3) the disposition of the elements is such that the ion collector is located essentially out of reach of the light emanating from the cathode as well as of any radiation, such as X-rays that may take place on the surface of the electron collector.

Accordingly, it is an object of the present invention to provide a pressure gauge which eliminates the aforementioned shortcomings encountered with the prior art construction by simple and operationally reliable means.

Another object of the present invention resides in the provision of an ionization pressure gauge capable of measuring a relatively wide range of pressures.

A further object of the present invention resides in the provision of an ionization gauge which considerably reduces the effects due to the residual current found in certain prior art ionization pressure gauges.

Another object of the present invention resides in the provision of a direct-reading pressure gauge which obviates the need for direct current amplifiers.

Still another object of the present invention resides in the provision of an ionization-type pressure gauge which permits the obtainment of relatively significant measuring currents thereby increasing the sensitivity and range of the gauge.

Figure 2:
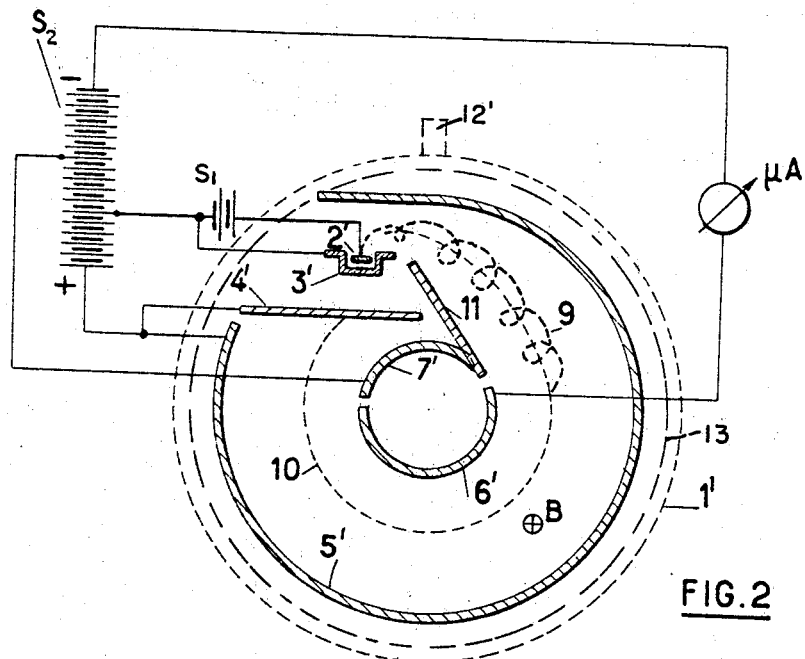
Figure 3:
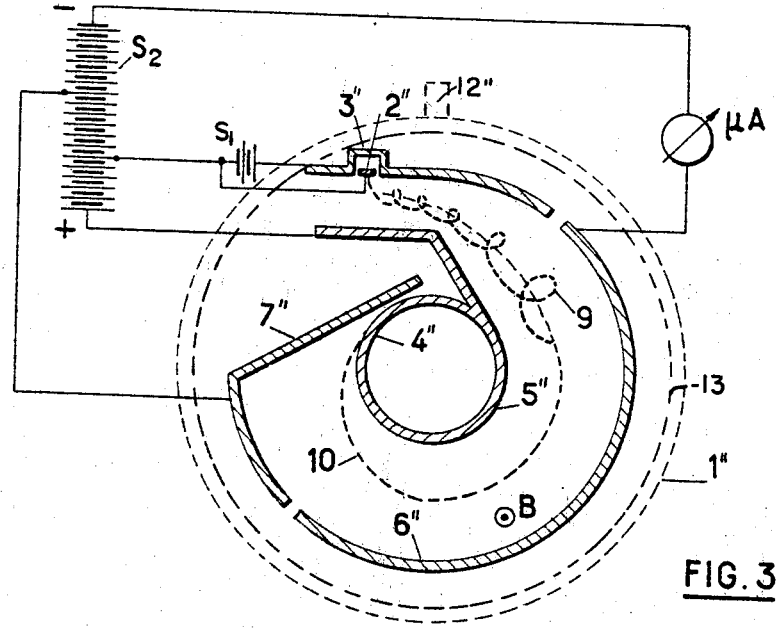

These and further objects, features and advantages of the present invention will become more obvious from the following description when taken in connection with the accompanying drawing which shows, for purposes of illustration only, several embodiments in accordance with the present invention, and wherein FIGURE 1 is a schematic cross sectional view through a first rectilinear embodiment of a pressure gauge in accordance with the present invention, and FIGURES 2 and 3 are schematic transverse cross sectional views through two further embodiments of pressure gauges of cylindrical construction in accordance with the present invention.

Referring now to the drawing wherein like reference numerals are used throughout the various views to designate like parts, and more particularly to FIGURE 1, the gauge in accordance with the present invention is illustrated in this figure in cross section on the inside of its envelope, indicated schematically by the rectangle 1 in dash lines.

The gauge comprises, near one extremity of the envelope 1, a thermionic cathode constituted by a tungsten wire 2, connected at one of the extremities thereof to a shield electrode 3 which surrounds the same on three sides thereof. At the other extremity of the envelope is placed an electron collector 4, connected to an electrode 5, bent at its two extremities.

An electrode 6 extends parallely to the rectilinear portion of the electrode 5. An electrode 7, which is connected on the inside of the envelope 1 to the electrode 3, is disposed between the electrode 6 and the electron collector 4, whereas a plate 8 is placed between the electrode 3 and the bent portion of the electrode 5 which faces the same.

A heating source $S_1$ is connected to the terminals of the filament 2, and a voltage source $S_2$ permits to suitably fix the potentials of the various electrodes with respect to the cathode 2. One can readily see from the drawing that the electrode 6 is connected to the negative pole of the source $S_2$ across a microammeter $\mu a$., the collector 4 is made positive, and the plate 8 slightly less positive than the collector 4, with respect to the cathode 2.

Finally a magnet or an electromagnet, having a pole piece 13, furnishes a magnetic field perpendicular to the plane of the drawing, and schematically indicated by the cross B.

In operation, the electrons emitted by the filament 2 penetrate into the space comprised between electrodes 5 and 6 where they find themselves subjected, on the one hand, to the action of the electrostatic field, due to the difference of potential between the electrodes 5 and 6, and on the other, to the magnetic field B which is perpendicular to the electrostatic field. One chooses then for the ratio of the intensities of the two fields a value such that the electrons propagate within the space under consideration along trochoidal trajectories prior to being captured at the output of this space by the collector 4, carried at a positive potential. To simplify the drawing, one has indicated at 9 some of the trochoidal loops which extend, in reality, over the entire path 10. The parameters necessary to achieve such a beam path are quite well known in the art as evidenced, for example, by the Iskenderian patent, U.S. 2,776,274, the Labin patent, U.S. 2,723,376, and other publications relating to crossed-field devices.

The gas, whose pressure one desires to measure, is admitted through a conduit 12 into the gauge where it ionizes within the space traversed by the electrons. Since, by reason of their high mass, the ions are practically not affected by the presence of the magnetic field, they fall directly on the electrode 6, polarized negatively, which functions consequently as ion collector. The pressure of the gas is then represented by the intensity of the ion current, read on the measuring apparatus $\mu a$.

One can readily see that in the device according to the present invention described above, which resembles to a certain extent that of travelling wave tubes with crossed fields, the ion collector 6 of the gauge cannot be reached in any manner either by the light of the heating filament 2 or by any portion of radiations, such as X-rays, which may take place on the surface of the electron collector 4.

The great length of the trochoidal trajectories leads to numerous encounters between electrons and gas molecules, and the ionization degree thus obtained is very high. One will also note in that connection that there exists an interest in adopting conventional means imparting to the trochoidal loops the greatest possible diameter within the space comprised between the parallel electrodes 5 and 6.

The electron currents utilized are stronger than the maximum value imposed on the magnetron gauges by the necessity to avoid the oscillations in the latter, and the currents in the ion collector have, under these conditions, considerably higher values than in the magnetron gauges.

Additionally, the magnetic field necessary for the operation of the gauge according to the present invention is considerably reduced in comparison to the fields necessary in the magnetron gauges; a significant and important reduction of the weight and encumbrance of the magnets follows therefrom.

The advantages of the rectilinear realization of FIGURE 1 will be found again in the gauges of cylindrical form of FIGURES 2 and 3 constructed according to the same principle.

In FIGURE 2, there is indicated in the dash lines a cylindrical envelope 1', on the inside of which the gauge comprises elements operating as in FIGURE 1, to wit: the filament 2', the shield electrode 3', the electron collector 4', the two parallel electrodes 5' and 6', and the electrode 7' facing the collector 4'. This modification comprises additionally a supplementary electrode 11, carried at the same potential as the electrode 7'.

In FIGURE 2, the external cylinder 5' is positive with respect to internal cylinder comprising the electrodes 6' and 7'. This arrangement is reversed in the modification of FIGURE 3 in which the external electrode 6' is negative and the internal cylinder 5' is positive. The direction of the electrostatic field between the parallel electrodes 5' and 6' is therefore reversed in this embodiment as compared to FIGURE 2, and for that reason one also reverses the direction of the magnetic field, indicated at B by a cross in FIGURE 2 and by a point in FIGURE 3 (field directed from in front to the rear of the plane of the drawing in FIGURE 2 and from behind to in front of the drawing in FIGURE 3).

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A crossed-field ionization gauge for measuring low pressures in gaseous matter, comprising:
    two substantially parallel electrode means defining therebetween a duct, a source of electrons including emissive cathode means near one end of said duct,
    electron collector means near the other end of said duct,
    means for producing between said parallel electrode means a direct-current electric field, whereby one electrode means is rendered more negative than the other electrode means,
    means for establishing in said duct a magnetic field substantially perpendicular to said electric field to propagate the electrons along trochoidal trajectories from said source through said duct toward said electron collector means,
    means to enable introduction into said duct of the gas whose pressure is to be measured by ionization as a result of collisions of the gas molecules with electrons, the positive ions being attracted by the more negative of the two substantially parallel electrode means,
    means for measuring the ion flow on said more negative electrode means for determining the pressure of the gas,
    and means for shielding said more negative electrode means against light from said cathode means and from radiation from said electron collector means.

2. A crossed-field ionization gauge for measuring low pressures in gaseous matter, comprising:

two substantially parallel electrode means defining therebetween a duct, a source of electrons including emissive cathode means near one end of said duct, electron collector means near the other end of said duct, means for producing between said parallel electrode means a direct-current electric field, whereby one electrode means is rendered more negative than the other electrode means, means for establishing in said duct a magnetic field substantially perpendicular to said electric field to propagate the electrons along trochoidal trajectories from said source through said duct toward said electron collector means, means to enable introduction into said duct of the gas whose pressure is to be measured by ionization as a result of collisions of the gas molecules with electrons, the positive ions being attracted by the more negative of the two substantially parallel electrode means, means for measuring the ion flow on said more negative electrode means for determining the pressure of the gas, and means for shielding said more negative electrode means against light from said cathode means and from radiation from said electron collector means including first shielding means positioned near said cathode means and second shielding means positioned near said electron collector means.

3. A crossed-field ionization gauge for measuring low pressures in gaseous matter, comprising:

two substantially parallel electrode means defining therebetween a duct, a source of electrons including emissive cathode means near one end of said duct, electron collector means near the other end of said duct, means for producing between said parallel electrode means a direct-current electric field, whereby one electrode means is rendered more negative than the other electrode means, means for establishing in said duct a magnetic field substantially perpendicular to said electric field in order to propagate the electrons along trochoidal trajectories from said source through said duct toward said electron collector means, means to enable introduction into said duct of the gas whose pressure is to be measured by ionization as a result of collisions of the gas molecules with electrons, the positive ions being attracted by the more negative of the two substantially parallel electrode means, means for measuring the ion flow on said more negative electrode means for determining the pressure of the gas, and means for shielding said more negative electrode means against light from said cathode means and from radiation from said electron collector means including first shielding means positioned near said cathode means and second shielding means positioned near said electron collector means, said parallel electrode means being rectilinear at least over a major portion thereof.

4. A crossed-field ionization gauge for measuring low pressures in gaseous matter, comprising:

two substantially parallel electrode means defining therebetween a duct, a source of electrons including emissive cathode means near one end of said duct, electron collector means near the other end of said duct, means for producing between said parallel electrode means a direct-current electric field, whereby one electrode means is rendered more negative than the other electrode means, means for establishing in said duct a magnetic field substantially perpendicular to said electric field in order to propagate the electrons along trochoidal trajectories from said source through said duct toward said electron collector means, means to enable introduction into said duct of the gas whose pressure is to be measured by ionization as a result of collisions of the gas molecules with electrons, the positive ions being attracted by the more negative of the two substantially parallel electrode means, means for measuring the ion flow on said more negative electrode means for determining the pressure of the gas, and means for shielding said more negative electrode means against light from said cathode means and from radiation from said electron collector means including first shielding means positioned near said cathode means and second shielding means positioned near said electron collector means, said parallel electrode means being curved at least over a major portion thereof.

5. A gauge as claimed in claim 3, wherein the extremities of one of said parallel rectilinear electrode means are bent.

6. A gauge as claimed in claim 4, wherein said more negative electrode means is positioned within the other of said parallel electrode means.

7. A gauge as claimed in claim 4, wherein said more negative electrode means surrounds the other of said parallel electrode means.

References Cited

UNITED STATES PATENTS

| | | |
|---|---|---|
| 2,761,975 | 9/1956 | Weisz. |
| 2,820,946 | 1/1958 | Robinson _____ 324—33 |
| 3,292,078 | 12/1966 | Herzog _____ 324—33 |

RUDOLPH V. ROLINEC, *Primary Examiner.*

C. F. ROBERTS, *Assistant Examiner.*